United States Patent
Fornage et al.

(10) Patent No.: US 9,479,082 B2
(45) Date of Patent: Oct. 25, 2016

(54) METHOD AND APPARATUS FOR RESONANT POWER CONVERSION

(75) Inventors: Martin Fornage, Petaluma, CA (US); Donald Richard Zimmanck, Petaluma, CA (US)

(73) Assignee: Enphase Energy, Inc., Petaluma, CA (US)

(*) Notice: Subject to any disclaimer, the term of this patent is extended or adjusted under 35 U.S.C. 154(b) by 0 days.

(21) Appl. No.: 13/342,368

(22) Filed: Jan. 3, 2012

(65) Prior Publication Data
US 2012/0170341 A1     Jul. 5, 2012

Related U.S. Application Data

(60) Provisional application No. 61/460,526, filed on Jan. 4, 2011.

(51) Int. Cl.
H02M 7/5387     (2007.01)
H02M 5/297     (2006.01)

(52) U.S. Cl.
CPC ........... *H02M 7/5387* (2013.01); *H02M 5/297* (2013.01); *Y02B 70/1441* (2013.01)

(58) Field of Classification Search
CPC ........ H02M 5/16; H02M 5/27; H02M 5/297; H02M 7/4807; H02M 7/4826; H02M 7/5387; H02M 2007/4815; H02M 2001/007; H02M 2001/0058; H02M 3/335; H02M 3/33507
USPC ............. 363/8, 10, 16, 17, 21.02, 21.03, 37, 363/123, 132, 149, 157, 159, 161, 163–165
See application file for complete search history.

(56) References Cited

U.S. PATENT DOCUMENTS

| | | | |
|---|---|---|---|
| 4,012,682 A | | 3/1977 | Carroll et al. |
| 4,363,243 A | | 12/1982 | Poff |
| 4,417,477 A | | 11/1983 | Poff |
| 4,459,532 A | | 7/1984 | Schutten et al. |
| 4,459,535 A | | 7/1984 | Schutten et al. |
| 4,469,999 A | | 9/1984 | Swenson |
| 4,570,214 A | * | 2/1986 | Tanaka ................... 363/160 |
| 4,706,175 A | | 11/1987 | Schutten et al. |
| 4,706,183 A | | 11/1987 | Schutten et al. |
| 4,757,434 A | * | 7/1988 | Kawabata et al. .......... 363/41 |
| 5,159,539 A | * | 10/1992 | Koyama ..................... 363/8 |

(Continued)

FOREIGN PATENT DOCUMENTS

| | | |
|---|---|---|
| CN | 1853335 A | 10/2006 |
| CN | 101136596 A | 3/2008 |

(Continued)

OTHER PUBLICATIONS

US 6,181,581, 01/2001, Johnson, Jr. et al. (withdrawn)

(Continued)

*Primary Examiner* — Timothy J Dole
*Assistant Examiner* — Ivan Laboy Andino
(74) *Attorney, Agent, or Firm* — Moser Taboada

(57) ABSTRACT

A method and apparatus for providing multi-phase power. In one embodiment, the apparatus comprises a cycloconverter controller for determining a charge ratio based on a reference waveform; and a cycloconverter, coupled to the cycloconverter controller and to a multi-phase AC line, for selectively coupling an alternating current to each line of the multi-phase AC line based on the charge ratio.

17 Claims, 8 Drawing Sheets

(56) References Cited

U.S. PATENT DOCUMENTS

| | | | |
|---|---|---|---|
| 5,182,463 A | | 1/1993 | Yamamoto et al. |
| 5,274,538 A | * | 12/1993 | Sashida et al. .................. 363/8 |
| 5,285,365 A | * | 2/1994 | Yamato et al. .................. 363/8 |
| 5,285,371 A | * | 2/1994 | Sanada et al. .................. 363/71 |
| 5,329,439 A | | 7/1994 | Borojevic et al. |
| 5,460,244 A | | 10/1995 | Tanahashi |
| 5,652,503 A | | 7/1997 | Urban et al. |
| 6,330,170 B1 | | 12/2001 | Wang et al. |
| 7,050,312 B2 | | 5/2006 | Tracy et al. |
| 7,088,601 B2 | | 8/2006 | Tracy et al. |
| 7,113,405 B2 | | 9/2006 | Armstrong et al. |
| 7,187,149 B1 | | 3/2007 | Balog, Jr. et al. |
| 7,405,494 B2 | | 7/2008 | Tassitino, Jr. et al. |
| 7,508,094 B2 | | 3/2009 | Johnson, Jr. et al. |
| 7,561,451 B2 | | 7/2009 | Tracy et al. |
| 7,564,703 B1 | | 7/2009 | Braun et al. |
| 7,583,109 B2 | | 9/2009 | Oughton, Jr. |
| 7,684,222 B2 | | 3/2010 | Paatero |
| 7,738,271 B1 | | 6/2010 | Argo et al. |
| 7,768,800 B2 | * | 8/2010 | Mazumder et al. ............ 363/17 |
| 7,773,396 B2 | | 8/2010 | Ollila et al. |
| 7,800,924 B2 | | 9/2010 | Oughton, Jr. |
| 7,948,778 B2 | | 5/2011 | Pfitzer et al. |
| 2003/0169006 A1 | | 9/2003 | Allen |
| 2007/0024257 A1 | | 2/2007 | Boldo |
| 2007/0035265 A1 | * | 2/2007 | Balog et al. .................. 318/439 |
| 2008/0239775 A1 | | 10/2008 | Oughton et al. |
| 2008/0265681 A1 | | 10/2008 | Pfitzer et al. |
| 2008/0309301 A1 | | 12/2008 | Shimada et al. |
| 2009/0016083 A1 | * | 1/2009 | Soldano et al. ................ 363/20 |
| 2009/0034299 A1 | * | 2/2009 | Lev ................................. 363/17 |
| 2009/0225569 A1 | | 9/2009 | Begalke |
| 2009/0323380 A1 | | 12/2009 | Harrison |
| 2010/0014322 A1 | | 1/2010 | Harrison |
| 2010/0182803 A1 | * | 7/2010 | Nan et al. .................. 363/21.02 |
| 2010/0284208 A1 | * | 11/2010 | Nguyen et al. ............... 363/160 |
| 2010/0290174 A1 | | 11/2010 | Harrison |
| 2011/0038181 A1 | * | 2/2011 | Yan et al. ........................ 363/17 |
| 2011/0181128 A1 | | 7/2011 | Perreault et al. |
| 2011/0278932 A1 | | 11/2011 | Navarro et al. |
| 2012/0038434 A1 | | 2/2012 | Harrison |
| 2012/0068541 A1 | | 3/2012 | Anderson |
| 2012/0074786 A1 | | 3/2012 | Johnson, Jr. et al. |
| 2012/0086536 A1 | | 4/2012 | Harrison |
| 2012/0092913 A1 | | 4/2012 | Harrison |
| 2012/0139514 A1 | | 6/2012 | Paatero |
| 2012/0153995 A1 | | 6/2012 | Oughton, Jr. et al. |
| 2012/0300524 A1 | * | 11/2012 | Fornage et al. ............. 363/132 |
| 2012/0320648 A1 | | 12/2012 | Harrison et al. |

FOREIGN PATENT DOCUMENTS

| | | |
|---|---|---|
| EP | 0487970 A2 | 6/1992 |
| EP | 1744140 A2 | 1/2007 |
| EP | 2079140 A1 | 7/2009 |
| JP | 8168266 A | 6/1996 |
| RU | 2256284 C1 | 7/2005 |
| SU | 1713045 A1 | 2/1992 |
| WO | 0165659 A2 | 9/2001 |
| WO | 2006043837 A2 | 4/2006 |
| WO | 2007080429 A2 | 7/2007 |
| WO | 2008026938 A2 | 3/2008 |
| WO | 2009098093 A2 | 8/2009 |
| WO | 2010055282 A1 | 5/2010 |
| WO | 2011062508 A2 | 5/2011 |
| WO | 2011102910 A1 | 8/2011 |
| WO | 2012002824 A2 | 1/2012 |
| WO | 2012002825 A2 | 1/2012 |
| WO | 2012005604 A2 | 1/2012 |
| WO | 2012062375 A1 | 5/2012 |
| WO | 2012081998 A2 | 6/2012 |

OTHER PUBLICATIONS

Trubitsyn et al. (Trubitsyn et al., "High-Efficiency Inverter for Photovoltaic Applications", Energy Conversion Congress and Exposition (ECCE), 2010 IEEE , pp. 2803,2810, 12-16.*

Christian P. Dick, Furkan K. Titiz, Rik W. De Doncker, "A High-Efficient LLCC Series-Parallel Resonant Converter", Institute for Power Electronics and Electrical Drives (ISEA), RWTH Aachen University, Jaegerstr. 17-19, 52066 Aachen, Germany; IEEE 2010, 6 pages.

Vlatkovic et al., "Analysis and Design of a Zero-Voltage Switched, Three-Phase PWM Rectifier With Power Factor Correction", Virginia Power Electronics Center, Virginia Polytechnic Institute and State University; IEEE 1992, 10 pages.

Fujimoto, H., et al., "Photovoltaic Inverter with a Novel Cycloconverter for Interconnection to a Utility Line", Conference Record of the 1995 IEEE, Abstract, 2 pages.

J.Devi Shree and P.Anbalagan, "Power Quality Improvement in Photovoltaic Systems", Asian Power Electronics Journal, vol. 1, No. 1, Aug. 2007, 5 pages.

Barsoum, N. N. & Png, F.T.C., "High Quality AC Power With Triac Inverter", downloaded from http://www.itee.uq.edu.au/~aupec/aupec06/htdocs/content/pdf/2.pdf, Aug. 2010.

Rocabert, J., et al., "A Regenerative Active Clamp Circuit for DC/AC Converters with High-Frequency Isolation in Photovoltaic Systems", Power Electronics Specialists Conference, 2004, PESC 04. 2004 IEEE 35th Annual Issue Date: Jun. 20-25, 2004, Abstract, 2 pages.

Chao Lu et al., "Efficient Power Conversion for Ultra Low Voltage Micro Scale Energy Transducers", Design, Automation & Test in Europe Conference & Exhibition (Date), 2010, Issue Date: Mar. 8-12, 2010, Abstract, 2 pages.

Ashish Bendre et. al, "Modeling and Design of a Neutral-Point Voltage Regulator for a Three-Level Diode-Clamped Inverter Using Multiple-Carrier Modulation", IEEE Transactions on Industrial Electronics, vol. 53, No. 3, pp. 718-726; Abstract, 2 pages, Jun. 2006.

International Search Report mailed May 22, 2012 for PCT Application No. PCT/US2012/020058, 5 pages.

Written Opinion of the International Searching Authority mailed May 22, 2012 for PCT Application No. PCT/US2012/020058, 4 pages.

Trubitsyn et al., "High-Efficiency Inverter for Photovoltaic Applications", Energy Conversion Congress and Exposition (ECCE), 2010 IEEE, pp. 2803-2810, 2010.

* cited by examiner

METHOD AND APPARATUS FOR RESONANT POWER CONVERSION

CROSS-REFERENCE TO RELATED APPLICATIONS

This application claims benefit of U.S. provisional patent application Ser. No. 61/460,526, filed Jan. 4, 2011, which is herein incorporated in its entirety by reference.

BACKGROUND OF THE INVENTION

1. Field of the Invention

Embodiments of the present disclosure relate generally to power conversion, and, in particular, to controlling power conversion in a resonant converter.

2. Description of the Related Art

Resonant converters provide many advantages over other types of power converters. Such advantages may include low noise, low component stress, low component count, and predictable conduction-dominated losses. Resonant converters may therefore be smaller, less costly, and more efficient devices than other types of converters.

Therefore, there is a need in the art for a method and apparatus for efficiently converting a DC voltage to an AC voltage utilizing a resonant converter.

SUMMARY OF THE INVENTION

Embodiments of the present invention generally relate to a method and apparatus for providing multi-phase power. In one embodiment, the apparatus comprises a cycloconverter controller for determining a charge ratio based on a reference waveform; and a cycloconverter, coupled to the cycloconverter controller and to a multi-phase AC line, for selectively coupling an alternating current to each line of the multi-phase AC line based on the charge ratio.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
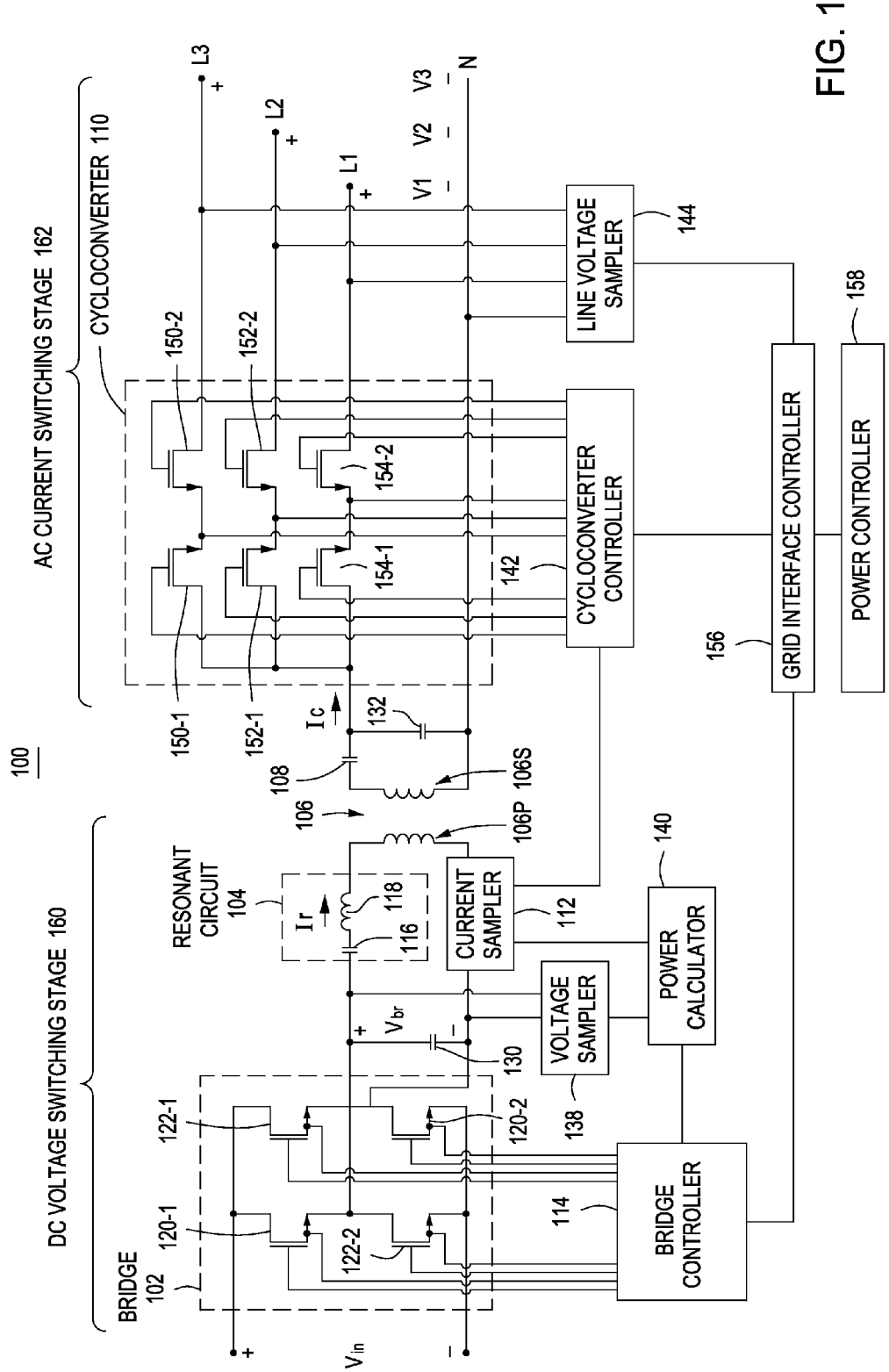
FIG. 1 is a block diagram of a resonant converter in accordance with one or more embodiments of the present invention.

FIG. 1 is a block diagram of a resonant converter 100 in accordance with one or more embodiments of the present invention. This diagram only portrays one variation of the myriad of possible system configurations. The present invention can function in a variety of power generation environments and systems.

The resonant converter 100 comprises a bridge 102 coupled across a parallel input capacitor 130 and a series combination of a capacitor 116, an inductor 118, a primary winding 106P of a transformer 106, and a current sampler 112. Such components form a DC voltage switching stage 160 of the resonant converter 100. In some embodiments, at least a portion of the capacitance of the parallel input capacitor 130 may be due to parasitic capacitance from switching devices within the resonant converter 100.

The bridge 102 is a full H-bridge comprising switches 120-1, 120-2, 122-1, and 122-2 (e.g., n-type metal-oxide-semiconductor field-effect transistors, or MOSFETs) arranged such that switches 120-1/120-2 and 122-1/122-2 form first and second diagonals, respectively, of the H-bridge. Gate terminals and source terminals of each of the switches 120-1, 120-2, 122-1, and 122-2 are coupled to a bridge controller 114 for operatively controlling the switches. In other embodiments, the switches 120-1, 120-2, 122-1, and 122-2 may be any other suitable electronic switch, such as insulated gate bipolar transistors (IGBTs), bipolar junction transistors (BJTs), p-type MOSFETs, gate turnoff thyristors (GTOs), and the like. The bridge 102 operates at a switching speed of approximately 100 kilohertz (kHz) and is able to switch, for example, from 60 to 600 volts depending upon the DC voltage source to the bridge; in other embodiments, the bridge 102 may operate at a different switching frequency. In some other embodiments, the bridge 102 may be a half H-bridge rather than a full H-bridge.

A first output terminal of the bridge 102 is coupled between the switches 120-1 and 122-2, and is also coupled to a first terminal of the parallel input capacitor 130 and to a first terminal of the capacitor 116. A second terminal of the capacitor 116 is coupled to a first terminal of the inductor 118, and a second terminal of the inductor 118 is coupled to a first terminal of the primary winding 106P. The capacitor 116 and the inductor 118 form a series resonant circuit 104 operating at a frequency of 100 kHz; alternatively, the resonant circuit 104 may operate at a different resonant frequency. In some embodiments, the inductor 118 may represent a leakage inductance of the transformer 106 rather than being a separate discrete inductor and the resonant circuit for the converter is formed between the transformer 106 and the capacitor 116, thereby reducing the overall component count of the resonant converter 100. In other embodiments, other types of resonant circuits (e.g., series LC, parallel LC, series-parallel LLC, series-parallel LCC, series-parallel LLCC, and the like) may be utilized within the resonant converter 100 in place of or in addition to the resonant circuit 104.

The current sampler 112 is coupled between a second terminal of the primary winding 106P and a second output terminal of the bridge 102, where the second output terminal is coupled between the switches 122-1 and 120-2. Additionally, a voltage sampler 138 is coupled across the parallel input capacitor 130; both the voltage sampler 138 and the current sampler 112 are coupled to a power calculator 140, and the power calculator 140 is coupled to the bridge controller 114.

On the secondary side of the transformer 106, a first terminal of a secondary winding 106S is coupled to a first terminal of a capacitor 108. A second terminal of the capacitor 108 is coupled to a first terminal of a parallel output capacitor 132, and a second terminal of the parallel output capacitor 132 is coupled to a second terminal of the secondary winding 106S. A cycloconverter 110 is coupled across the parallel output capacitor 132 and forms an AC current switching stage 162 of the resonant converter 100. By selection of both the parallel input capacitor 130 and the parallel output capacitor 132, the resonant converter 100 can be designed to modulate over a wide range of power with a relatively small change in switching frequency of the bridge 102.

In some embodiments, the capacitor 116 may be on the order of 25 nanofarad (nF), the inductor 118 may be on the order of 100 microhenries (μH), the parallel input capacitor 130 may be on the order of 1 nF, the parallel output capacitor 132 may be on the order of 5 nF, and the transformer 106 may have a turns ratio of 1:1.5; such embodiments may have a frequency range of 150 kilohertz (kHz)—300 kHz. Generally, the series capacitance of the resonant circuit 104 may be on the order of 25 nF. For example, the capacitor 116 may be on the order of 25 nF and the capacitor 108 may be made extremely large such that it acts as a DC blocking capacitor and does not affect the resonance of the circuit. Alternatively, for a transformer turns ratio of 1:1.5, the capacitor 116 may be on the order of 50 nF and the capacitor 108 may be on the order of 22.2 nF (i.e., the capacitor 108 appears as a 50 nF capacitor in series with the capacitor 116 as a result of the transformer turns ratio).

The cycloconverter 110 comprises switches 150-1, 150-2, 152-1, 152-2, 154-1, and 154-2. Drain terminals of the switches 150-1, 152-1, and 154-1 are coupled to the first terminal of the parallel output capacitor 132. Source terminals of each switch pair 150-1/150-2, 152-1/152-2, and 154-1/154-2 are coupled together (i.e., the source terminals of switches 150-1/150-2 are coupled together, the source terminals of switches 152-1/152-2 are coupled together, and the source terminals of switches 154-1/154-2 are coupled together). Drain terminals of the switches 154-2, 152-2, and 150-2 are coupled to first, second, and third output terminals, respectively, which in turn are coupled to lines L1, L2, and L3, respectively, of a three-phase AC line. Additionally, the second terminal of the output parallel capacitor 132 is coupled to a neutral line N of the three-phase AC line. In some embodiments, the AC line may be a commercial power grid system.

Gate and source terminals of each switch 150-1, 150-2, 152-1, 152-2, 154-1, and 154-2 are coupled to a cycloconverter controller 142, which is further coupled to the current sampler 112. The cycloconverter controller 142 operates (i.e., activates/deactivates) each of the cycloconverter switches to couple three-phase AC power to the AC line (i.e., a first phase is coupled to line L1, a second phase is coupled to line L2, and a third phase is coupled to line L3). The switch pair 150-1/150-2 form a first four-quadrant switch (i.e., a fully bi-directional switch), the switch pair 152-1/152-2 form a second four-quadrant switch, and the switch pair 154-1/154-2 form a third four-quadrant switch. In some embodiments, the switches 150-1, 150-2, 152-1, 152-2, 154-1, and 154-2 may be n-type MOSFET switches; in other embodiments, other suitable switches and/or arrangements of switches may be utilized for the first, the second, and the third four-quadrant switches.

A line voltage sampler 144 is coupled to the drain terminals of the switches 150-2, 152-2, and 154-2 (i.e., lines L1, L2, and L3, respectively), as well as to the second terminal of the output parallel capacitor 132 (i.e., line N). The line voltage sampler 144 is also coupled to a grid interface controller 156. The grid interface controller 156 is further coupled to the cycloconverter controller 142, the bridge controller 114, and a power controller 158.

During operation, the bridge 102 receives an input voltage Vin from a DC voltage source, such as one or more renewable energy sources (e.g., photovoltaic (PV) modules, wind farms, hydroelectric systems, or the like), batteries, or any suitable source of DC power. The bridge controller 114 alternately activates/deactivates the H-bridge diagonals (i.e., 180° out of phase) to generate a bridge output voltage Vbr that is a bipolar square wave; in some embodiments, the frequency at which the H-bridge diagonals are switched (i.e., the switching frequency) is on the order of 100 kHz. The bridge output voltage Vbr results in a substantially sinusoidal current Ir through the resonant circuit 104 (operating at a frequency of 100 kHz) and the primary winding 106P, thereby inducing an alternating current in the secondary winding 106S. The transformer 106 may be a step-up transformer for increasing the voltage from the primary to the secondary (for example, for a DC input generated by a PV module, the transformer 106 would generally be a step-up transformer) or, alternatively, a step-down transformer for decreasing the voltage.

As a result of the current induced in the secondary winding 106S, a substantially sinusoidal current waveform Ic at a frequency of 100 kHz flows into the cycloconverter 110. The amplitude of the current waveform Ic is controlled by the switching frequency of the bridge 102 and can be increased or decreased by suitably adjusting the switching frequency of the H-bridge; i.e., the current (and power) transferred varies as the signal frequency moves away from the resonant frequency of the resonant circuit 104. The power controller 158 determines an output power required from the resonant converter 100 and, via a three-phase reference current waveform generated by the grid interface controller 156, drives the bridge controller 114 to adjust the H-bridge switching frequency to achieve the required output power. In some embodiments where the resonant converter 100 receives input power from a PV module, the power controller 158 may determine the resonant converter required output power such that the PV module is biased at a maximum power point (MPP). In such embodiments, the power controller 158 may be coupled to the input of the bridge 102 for determining the voltage and current provided by the PV module. In other embodiments, the power controller 158 may receive commands from an external source to operate at a given power and power factor. For example, the resonant converter 100 may receive power from a PV module and the power controller 158 may receive a command (e.g., via the grid interface controller 156 or an alternative means) from a utility to run at a lower power than the MPP to help stabilize the grid.

The current sampler 112 samples the current Ir and generates values indicative of the sampled current ("current samples"), while the voltage sampler 138 samples the voltage Vbr and generates values indicative of the sampled primary side voltage ("primary voltage samples"). The current sampler 112 and the voltage sampler 138 may perform such sampling at a rate of 50 MHz, although other sampling rates may be used by the current sampler 112 and/or the voltage sampler 138. In some embodiments, the current sampler 112 and the voltage sampler 138 each comprise an analog-to-digital converter (ADC) for generating the samples in a digital format.

The current sampler 112 and the voltage sampler 138 respectively couple the current samples and primary voltage samples to the power calculator 140. Based on the current and voltage samples, the power calculator 140 computes the generated power level and couples such computed power level to the bridge controller 114. The bridge controller 114 then compares the computed power level to the required output power level and adjusts the switching frequency to increase or decrease the generated power as needed.

The cycloconverter 110 selectively couples the received current waveform Ic to each phase of the three-phase AC line at the cycloconverter output; in some embodiments, the AC line may be a commercial power grid operating at 60 Hz. In order to selectively couple the relatively high-frequency current Ic to each phase of the lower frequency AC line, a three-phase reference current waveform (also referred to as "reference current waveform") is generated by the grid interface controller 156 based on the required resonant converter output power from the power controller 158 and the three-phase AC line voltage as determined from line voltage samples generated by the line voltage sampler 144. The line voltage sampler 144 samples the AC line voltage (i.e., the grid voltage), for example at a rate of 30 kilo-samples per second (kSPS), and couples one or more values indicative of the sampled line voltages ("line voltage samples") to the grid interface controller 156. In some embodiments, the line voltage sampler 144 comprises an ADC for generating the samples in a digital format. Based on the received line voltage samples, the grid interface controller 156 generates the reference current waveform synchronous with the grid voltage waveform and couples the reference current waveform to the cycloconverter controller 142. The reference current waveform ensures that even if the grid voltage deviates from a sinewave, each output current generated can be controlled to match the desired output. In the event of the grid voltage and/or frequency deviating from required operational specifications, a supervisory system (not shown) will deactivate the resonant converter 100.

In some embodiments, i.e., for operating with a power factor of 1, the reference current waveform is generated in phase with the line voltage. In other embodiments where reactive power is being produced by the resonant converter 100, e.g., for providing Volt-Ampere-Reactive (VAR) compensation, the reference current waveform is generated out of phase with the line voltage. In three phase embodiments the reference current waveform will be of a three phase form. In some other embodiments, the reference current waveform may be a single-phase or split-phase AC waveform for coupling generated current to a single-phase or split-phase AC line.

Consecutive time windows, or "slices", of the reference current waveform are individually analyzed by the cycloconverter controller 142 to generate a "charge ratio" for driving the cycloconverter 110 to couple generated current to each output phase. Within each slice, the level of current for each phase of the reference current waveform can be represented by a single "DC" current value (i.e., one DC current value per phase) due to the relatively low line frequency with respect to the current Ic. A first DC current may represent the value of the first phase of the reference current waveform (e.g., the desired current to be injected into line L1) during the slice, a second DC current may represent the value of the second phase of the reference current waveform (e.g., the desired current to be injected into line L2) during the slice, and a third DC current may represent the value of the third phase of the reference current waveform (e.g., the desired current to be injected into line L3) during the slice. Given that the desired current to be injected on a particular line during a switching period is equal to the charge to be injected divided by the switching period, and the switching period is constant relative to the line frequency, the ratio of the desired current to be injected on each line is equal to the ratio of the charge to be injected on each line (i.e., the charge ratio). For example, if the relative values of the desired currents on lines L1/L2/L3 during a slice are 300/−100/−200, i.e., 3/−1/−2, respectively, L1 should receive the entire positive portion of the charge, L2 should receive ⅓ of the negative portion of the charge, and L3 should receive ⅔ of the negative portion of the charge. The charge ratio thus indicates the relative levels of current to be coupled to, or "steered" into, each output phase during a particular slice. For each slice, the cycloconverter controller 142 determines a charge ratio from the reference current waveform and operates the cycloconverter 110 to selectively couple the generated current to each phase of the AC line in accordance with the corresponding charge ratio. In some embodiments, each slice may be a fixed width, i.e., duration; in other embodiments, for example embodiments for multi-phase applications, the width of one or more slices may be varied (e.g., variation may be determined by the position in the phase). The cycloconverter 110 operates independent of the bridge 102; i.e., the bridge 102 controls the amplitude of the output current generated, and the cycloconverter 110 controls the ratio of output current steered into each output phase.

As described in more detail further below, the cycloconverter 110 may be operated such that one or more of the switches 150-1, 150-2, 152-1, 152-2, 154-1, and 154-2 remain activated (i.e., "on") during an entire slice. Such a "minimal transition" switching technique reduces gate drive voltage requirements as well as stress on one or more of the cycloconverter switches 150-1, 150-2, 152-1, 152-2, 154-1, and 154-2, thereby improving the overall operating efficiency of the resonant converter 110. Additionally, the switches within the bridge 102 and the cycloconverter 110 may be operated in a zero-voltage switching (ZVS) mode for further improved efficiency. In some embodiments, the resonant converter 100 may be operated in a ZVS mode for all of the resonant converter switching devices over the entire operating range.

In one or more other embodiments, the resonant converter 100 may interleave two or more power stages, switch among a plurality of modes of operation, and/or employ a burst technique where energy from the DC input is stored during one or more line voltage cycles and subsequently coupled (i.e., "bursted") to the AC line during a burst period of one or more line voltage cycles. In some alternative embodiments, such as the embodiment depicted in FIG. 6 as described in detail below, the cycloconverter 110 generates a single-phase AC output that is coupled to a single-phase AC line.

Figure 2:
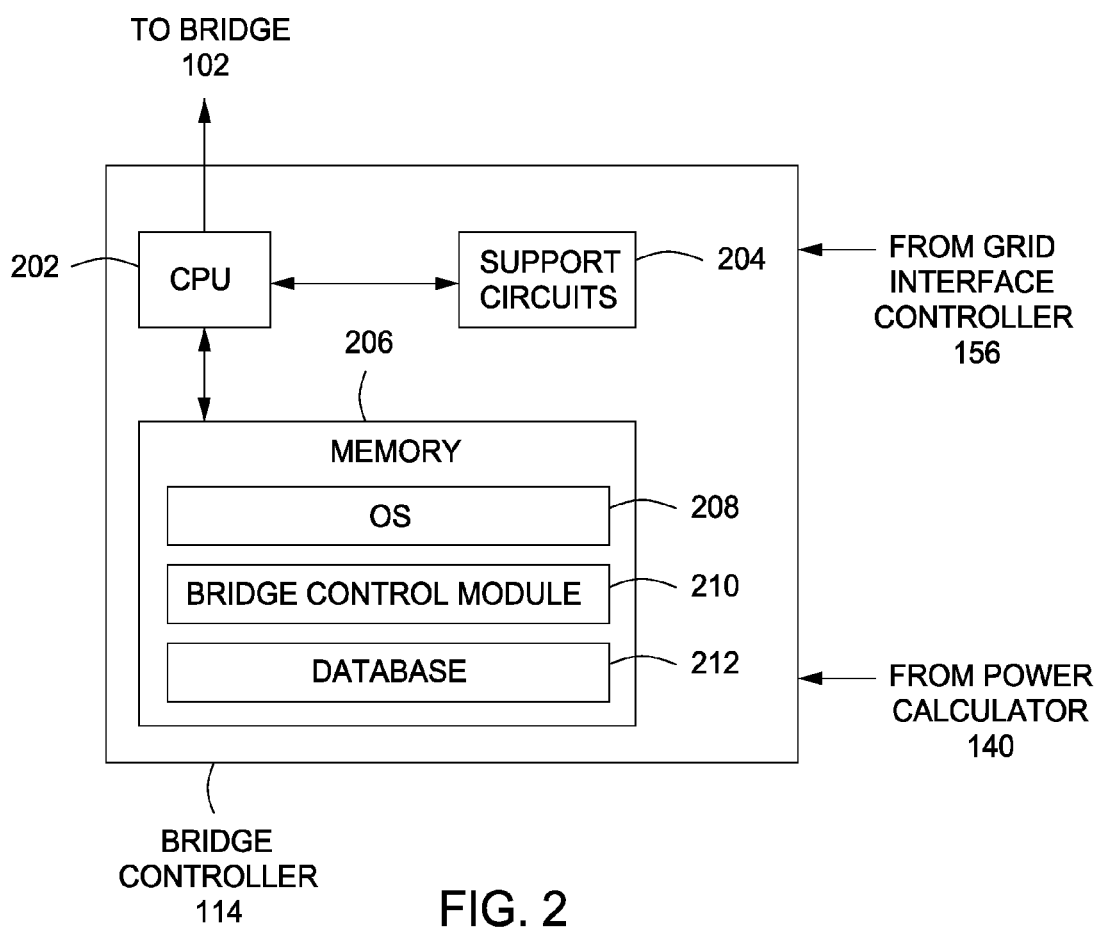
FIG. 2 is a block diagram of a bridge controller in accordance with one or more embodiments of the present invention.

FIG. 2 is a block diagram of a bridge controller 114 in accordance with one or more embodiments of the present invention. The bridge controller 114 comprises support circuits 204 and a memory 206, each coupled to a central processing unit (CPU) 202. The CPU 202 may comprise one or more conventionally available microprocessors or microcontrollers; alternatively, the CPU 202 may include one or more application specific integrated circuits (ASICs). The support circuits 204 are well known circuits used to promote functionality of the CPU 202. Such circuits include, but are not limited to, a cache, power supplies, clock circuits, buses, input/output (I/O) circuits, and the like. The bridge controller 114 may be implemented using a general purpose computer that, when executing particular software, becomes a specific purpose computer for performing various embodiments of the present invention.

The memory 206 may comprise random access memory, read only memory, removable disk memory, flash memory, and various combinations of these types of memory. The memory 206 is sometimes referred to as main memory and may, in part, be used as cache memory or buffer memory. The memory 206 generally stores the operating system (OS) 208, if necessary, of the bridge controller 114 that can be supported by the CPU capabilities.

The memory 206 may store various forms of application software, such as a bridge control module 210 for controlling operation of the bridge 102 and performing functions related to the present invention. For example, the bridge controller 114 executes the module 210 to use the required output power (e.g., as determined from the reference current waveform) and the calculated power from the power calculator 140 (i.e., the power generated at the output of the bridge 102) to adjust the bridge switching frequency above or below a nominal 100 kHz frequency. For embodiments where a PV module is coupled at the input of the resonant converter 100, changing the switching frequency of the bridge 102 alters the load impedance as seen by the PV module to achieve MPP. Further detail on the functionality provided by the bridge controller 114 is described below with respect to FIG. 7.

The memory 206 may additionally store a database 212 for storing data related to the operation of the resonant converter 100 and/or the present invention.

In other embodiments, the CPU 202 may be a microcontroller comprising internal memory for storing controller firmware that, when executed, provides the controller functionality described below with respect to FIG. 7.

Figure 3:
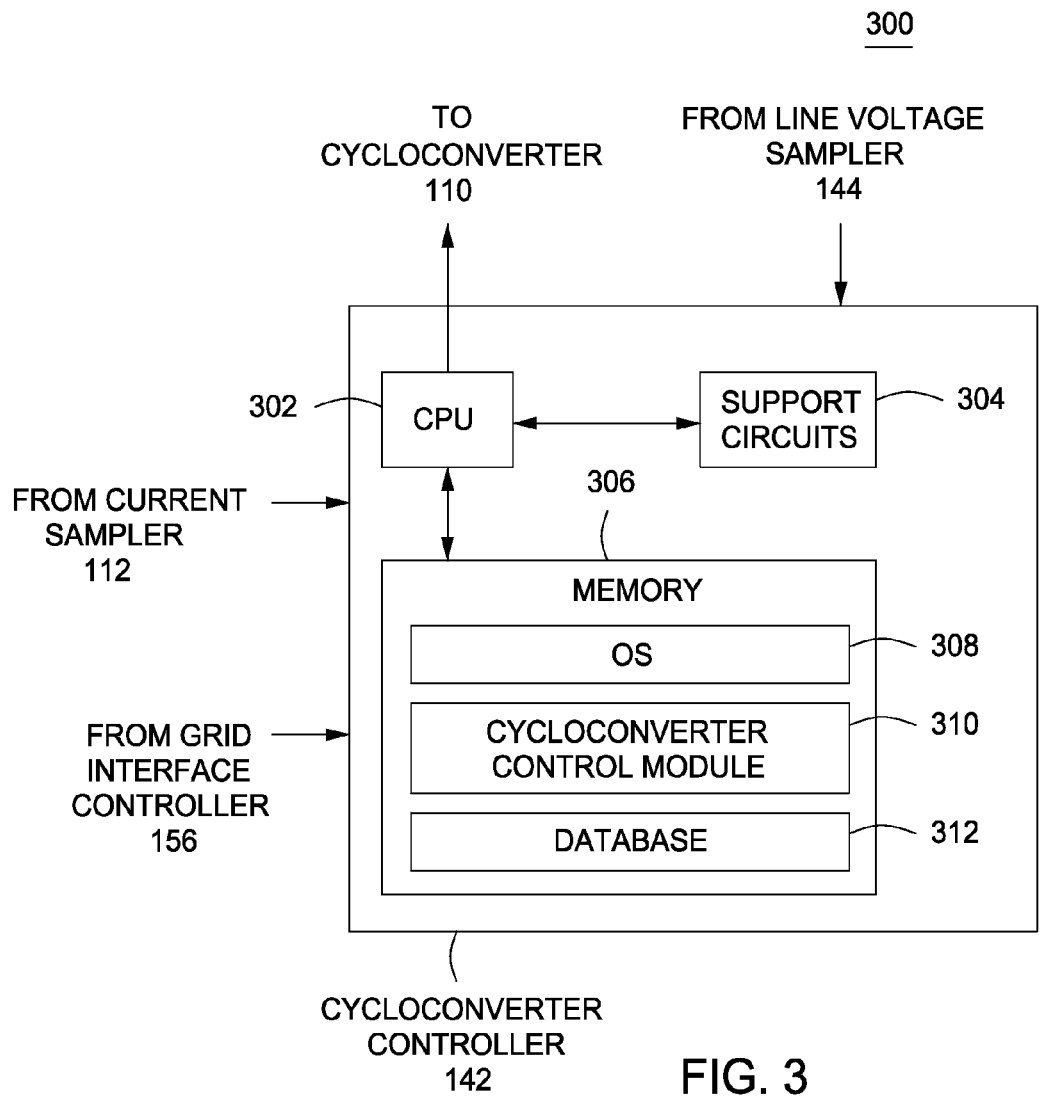
FIG. 3 is a block diagram of a cycloconverter controller in accordance with one or more embodiments of the present invention.

FIG. 3 is a block diagram of a cycloconverter controller 142 in accordance with one or more embodiments of the present invention. The cycloconverter controller 142 comprises support circuits 304 and a memory 306, each coupled to a central processing unit (CPU) 302. The CPU 302 may comprise one or more conventionally available microprocessors or microcontrollers; alternatively, the CPU 302 may include one or more application specific integrated circuits (ASICs). The support circuits 304 are well known circuits used to promote functionality of the CPU 302. Such circuits include, but are not limited to, a cache, power supplies, clock circuits, buses, input/output (I/O) circuits, and the like. The cycloconverter controller 142 may be implemented using a general purpose computer that, when executing particular software, becomes a specific purpose computer for performing various embodiments of the present invention.

The memory 306 may comprise random access memory, read only memory, removable disk memory, flash memory, and various combinations of these types of memory. The memory 306 is sometimes referred to as main memory and may, in part, be used as cache memory or buffer memory. The memory 306 generally stores the operating system (OS) 308, if necessary, of the cycloconverter controller 142 that can be supported by the CPU capabilities.

The memory 306 may store various forms of application software, such as a cycloconverter control module 310 for controlling operation of the cycloconverter 110 and performing functions related to the present invention. For example, the cycloconverter control module 310 monitors the high frequency current, determines the charge ratio for each slice, compares parameters (e.g., values of the line voltage phases) to determine whether any "dead zones" exist as described below, and selectively couples each generated current pulse to appropriate lines of the AC line based on the charge ratio; in some alternative embodiments, the grid interface controller 156 may compare relevant parameters to determine whether any dead zones exist. In some embodiments, the cycloconverter control module 310 may compute one or more slice widths based on one or more stored algorithms. Further detail on the functionality provided by the cycloconverter control module 310 is described below with respect to FIG. 8.

The memory 306 may additionally store a database 312 for storing data related to the operation of the cycloconverter 110 and/or the present invention, such as one or more dead zone thresholds, one or more DC voltages, one or more predetermined slice widths, one or more algorithms for determining slice widths, or the like.

In other embodiments, the CPU 302 may be a microcontroller comprising internal memory for storing controller firmware that, when executed, provides the controller functionality described below with respect to FIG. 8.

In some embodiments, the bridge controller 114 and the cycloconverter controller 142 may be a single controller controlled by the same CPU; i.e., a single controller may execute both the bridge control module 210 and the cycloconverter control module 310.

Figure 4:
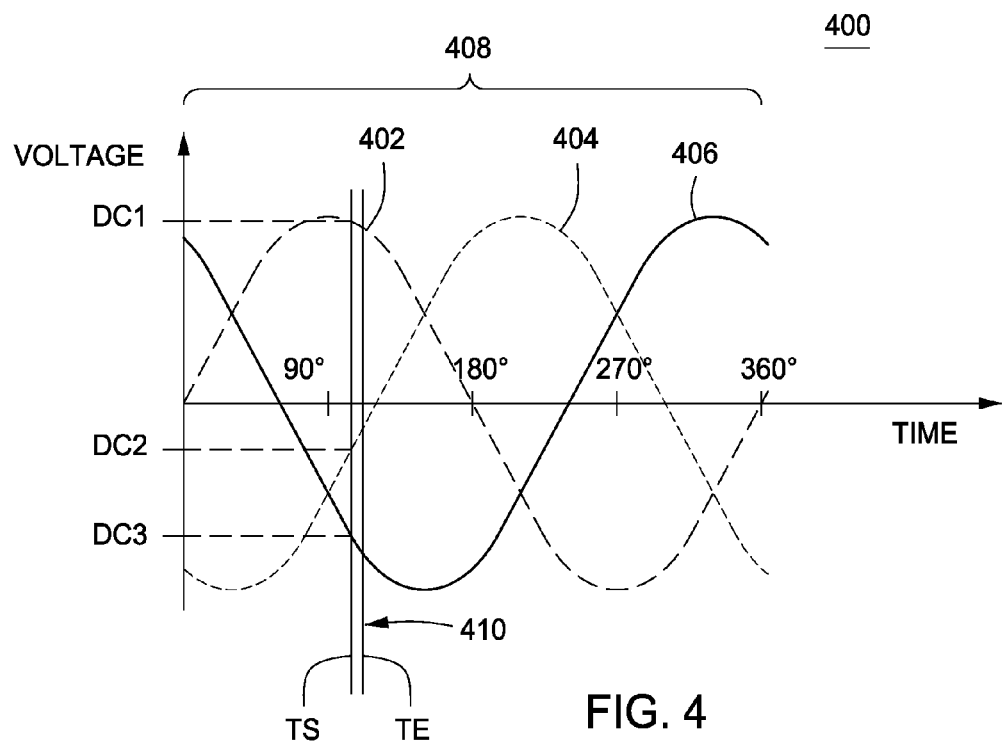
FIG. 4 is a graph depicting a slice of a three-phase reference current waveform in accordance with one or more embodiments of the present invention.

FIG. 4 is a graph 400 depicting a slice 410 of a three-phase reference current waveform 408 in accordance with one or more embodiments of the present invention. The graph 400 depicts a first phase waveform 402 of the reference current waveform 408 (e.g., a desired current to be injected into line L1), a second phase waveform 404 of the reference current waveform 408 (e.g., a desired current to be injected into line L2), and a third phase waveform 406 of the reference current waveform 408 (e.g., a desired current to be injected into line L3). The waveforms 402, 404, and 406 form the three-phase reference current waveform 408; for example, the waveforms 402, 404, and 406 each are at a frequency of 60 Hz and are offset from one another by 120 degrees. In some embodiments, the three-phase reference current waveform 408 is a reference for a desired current to be coupled to a commercial power grid.

A time window across the three-phase reference current waveform 408 (i.e., across each waveform 402, 404, and 406) is shown as the slice 410. The slice 410 starts at a start time TS and ends at an end time TE. In some embodiments, the width of the slice 410 (i.e., the time from TS to TE) may be approximately three-orders of magnitude faster than the three-phase reference current waveform 408. For example, for a commercial power grid coupled to the resonant converter 100 and operating at a frequency of 60 Hz, the slice 410 may have a width (i.e., duration) on the order of 10 s of microseconds. In other embodiments, the width of the slice 410 may be greater or less than 10 microseconds.

At time TS, the waveform 402 has a value of DC1, the waveform 404 has a value of DC2, and the waveform 406 has a value of DC3. The values DC1, DC2, and DC3 may be used as DC current values to represent the values of the waveforms 402, 404, and 406, respectively, during the entire slice 410 (i.e., from time TS to time TE). The ratio of the DC current values provides the charge ratio for the slice 410 for operating the cycloconverter switches from the time TS to the time TE, as described in detail below with respect to FIG. 5.

Figure 5:
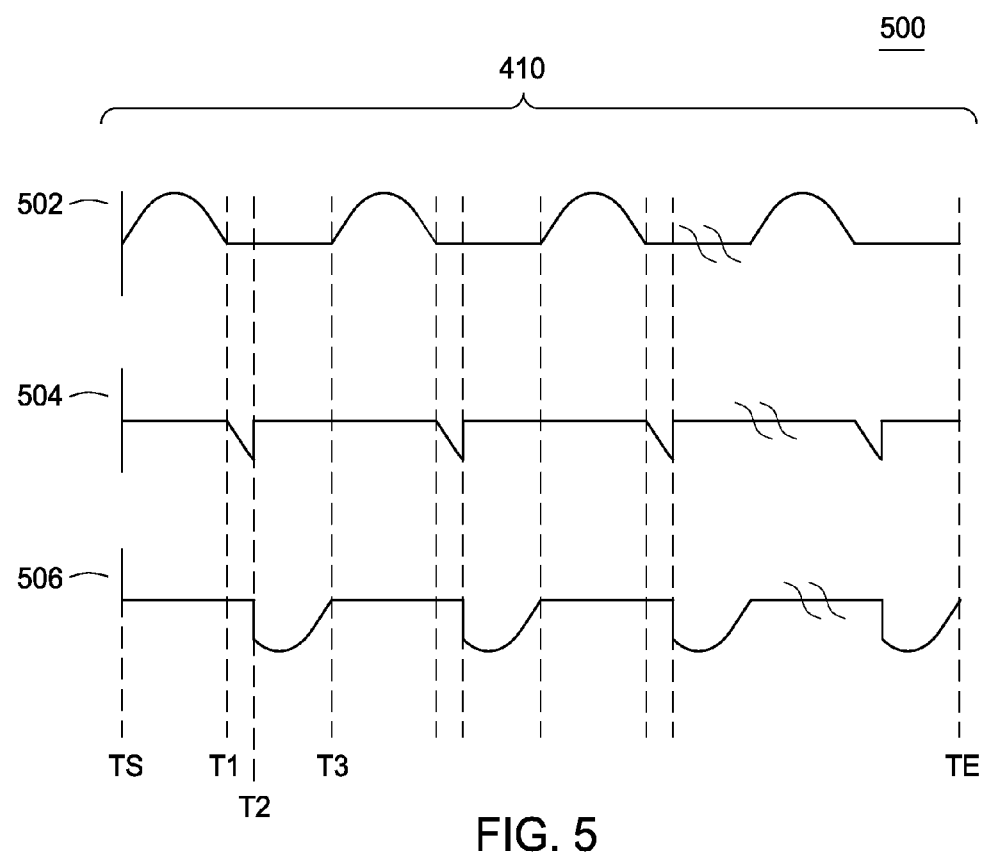
FIG. 5 is a set of graphs depicting current generated on each line of a three-phase AC line during a slice in accordance with one or more embodiments of the present invention.

FIG. 5 is a set of graphs 500 depicting current selectively coupled into each line of a three-phase AC line during a slice 410 in accordance with one or more embodiments of the present invention. As previously described, the cycloconverter controller 142 operates the cycloconverter 110 during a slice to selectively couple, or steer, current into each phase of the AC line in accordance with the charge ratio for the slice. For each cycle of the high-frequency current Ic during the slice 410, the cycloconverter 110 divides the current Ic based on the charge ratio (i.e., DC1/DC2/DC3) and selectively couples the divided current to the appropriate output line. Accordingly, the cycloconverter controller 142 does not require information pertaining to the actual values of current to be steered into each line, but only the relative ratios of the currents.

The graphs 500 comprise a first graph 502 depicting current steered into line L1 during the slice 410, a second graph 504 depicting current steered into line L2 during the slice 410, and a third graph 506 depicting current steered into line L3 during the slice 410. In some embodiments, such as the embodiment depicted in FIG. 5, the relative values of DC1, DC2, and DC3 for the slice 410 may be 3/−1/−2, respectively. In accordance with the charge ratio, the cycloconverter 110 selectively couples the entire positive portion of the charge to line L1, ⅓ of the negative portion of the charge to line L2, and ⅔ of the negative portion of the charge to line L3 as described below.

From time TS to T1, the cycloconverter controller 142 activates the switch pair 154-1/154-2 to couple the positive portion of the current Ic to line L1. Due to parasitic diodes of the switches, only one switch in each switch pair 150-1/150-2 and 152-1/152-2 needs to be deactivated under certain operating conditions to prevent any current from being coupled to lines L2 or L3; such a minimal transition switching technique of deactivating one switch within a pair while leaving the remaining switch active during the current cycle reduces energy requirements for switching in the resonant converter 100. To use minimal transition switching, the line voltage values on those lines not receiving output current must be sufficiently separated in order to prevent direct shorts between phases that may occur if all corresponding switches are not deactivated, If the difference between the voltages is equal to or exceeds a "dead zone" threshold, minimal transition switching may be used for the corresponding switch pairs during the current cycle; if the difference between the voltages is less than the dead zone threshold, minimal transition switching is not used for the corresponding switch pairs during the current cycle.

For the line voltages corresponding to the second and third phase waveforms 404 and 406 during the slice 410 (e.g., the values of the line voltages on lines L2 and L3 at time TS), if the values are close enough to satisfy a dead zone threshold, all of the switches in the switch pairs 150-1/150-2 and 152-1/152-2 are deactivated to prevent a direct short between the two phase lines L2 and L3. If, however, the values of the line voltages corresponding to the second and third phase waveforms 404 and 406 during the slice 410 are not close enough to satisfy the dead zone threshold, as in the embodiment depicted in FIG. 4, minimal transition switching may be employed and only one switch in each switch pair 150-1/150-2 and 152-1/152-2 need be deactivated. In some embodiments, the dead zone threshold may be on the order of 20 volts.

As a result of such switch activation/deactivation, the current steered into line L1 from time TS to T1 is a first half-cycle of the current waveform Ic; i.e., 100% of the positive portion of the Ic cycle as dictated by the charge ratio.

From time T1 to T2, the cycloconverter controller 142 activates the switch pair 152-1/152-2 and deactivates at least one switch in each switch pair 150-1/150-2 and 154-1/154-2 based on whether the values of the line voltages corresponding to the first and third phase waveforms 402 and 406 (e.g., the values of the line voltages on lines L1 and L3 at time TS) are close enough during the slice 410 to satisfy the dead zone threshold. For the embodiment depicted in FIG. 4, the dead zone threshold is not satisfied and only one switch in each switch pair 150-1/150-2 and 154-1/154-2 is deactivated (i.e., minimal transition switching is used). As a result of such switch activation/deactivation, the current steered into line L2 from time T1 to T2 is ⅓ of a second half-cycle of the current waveform Ic; i.e., 33.3% of the negative portion of the Ic cycle as dictated by the charge ratio.

From time T2 to T3, the cycloconverter controller 142 activates the switch pair 150-1/150-2 and deactivates at least one switch in each switch pair 152-1/152-2 and 154-1/154-2 based on whether the values of the line voltages corresponding to the first and second phase waveforms 402 and 404 (e.g., the values of the line voltages on lines L1 and L2 at time TS) are close enough during the slice 410 to satisfy the dead zone threshold. For the embodiment depicted in FIG. 4, the dead zone threshold is not satisfied and only one switch in each switch pair 152-1/152-2 and 154-1/154-2 is deactivated (i.e., minimal transition switching is used). As a result of such switch activation/deactivation, the current steered into line L3 from time T2 to T3 is ⅔ of the second half-cycle of the current waveform Ic; i.e., 66.7% of the negative portion of the Ic cycle as dictated by the charge ratio. Thus, from time TS to time T3, one full cycle of the current Ic is selectively coupled to the lines L1, L2, and L3.

From time T3 to TE, one or more additional cycles of the current waveform Ic may be selectively coupled to the lines L1, L2, and L3 in the same manner as during the time TS to T3 (i.e., in accordance with the charge ratio for the slice 410). In some embodiments, the width of the slice 410 is 10 microseconds and a single cycle of the current waveform Ic is transferred to the lines L1, L2, and L3 during the slice 410.

By selectively coupling the current Ic to the lines L1, L2, and L3 as described above, i.e., by partitioning each individual cycle of the current Ic based on the charge ratio and coupling the current Ic to output lines L1, L2, and L3 accordingly and by using minimal transition switching, the switch pairs 150-1/150-2 and 154-1/154-2 have zero-voltage switching (ZVS) and zero-current switching (ZCS) transitions, while the switch pair 152-1/152-2 has a ZVS transition at turn-on but no ZCS transition. As such, only one switch pair within the cycloconverter 110 experiences any switching losses and the cycloconverter 110 has the most zero-loss transitions possible.

Additionally, partitioning each individual cycle of the current Ic based on the charge ratio leads to the lowest peak-to-peak current waveform that can possibly be obtained on the cycloconverter 110 to obtain the desired power output. Further, such operation ensures that the voltage waveform being placed at the input is the most in-phase with the current that can possibly be obtained, making the load look as resistive as possible and improving system stability.

In one or more other embodiments, the times T1, T2, and/or T3 may be longer or shorter; i.e., each switch pair 150-1/150-2, 152-1/152-2, and 154-1/154-2 may remain on for a longer or shorter duration to selectively couple current to the lines L1, L2, and L3, although minimal switching losses are no longer experienced (i.e., ZVS/ZCS cannot be employed). In such embodiments, the ratio of current steered into each leg remains defined by the charge ratio for the slice but each individual cycle of the current Ic is not partitioned as per the charge ratio. For example, in an alternative embodiment having the charge ratio 3/–1/–2, the cycloconverter switches may be operated such that a first Ic cycle within a slice has all of its negative current steered into line L2 and subsequent second and third Ic cycles within the slice have all of their negative current steered into the line L3.

Figure 6:
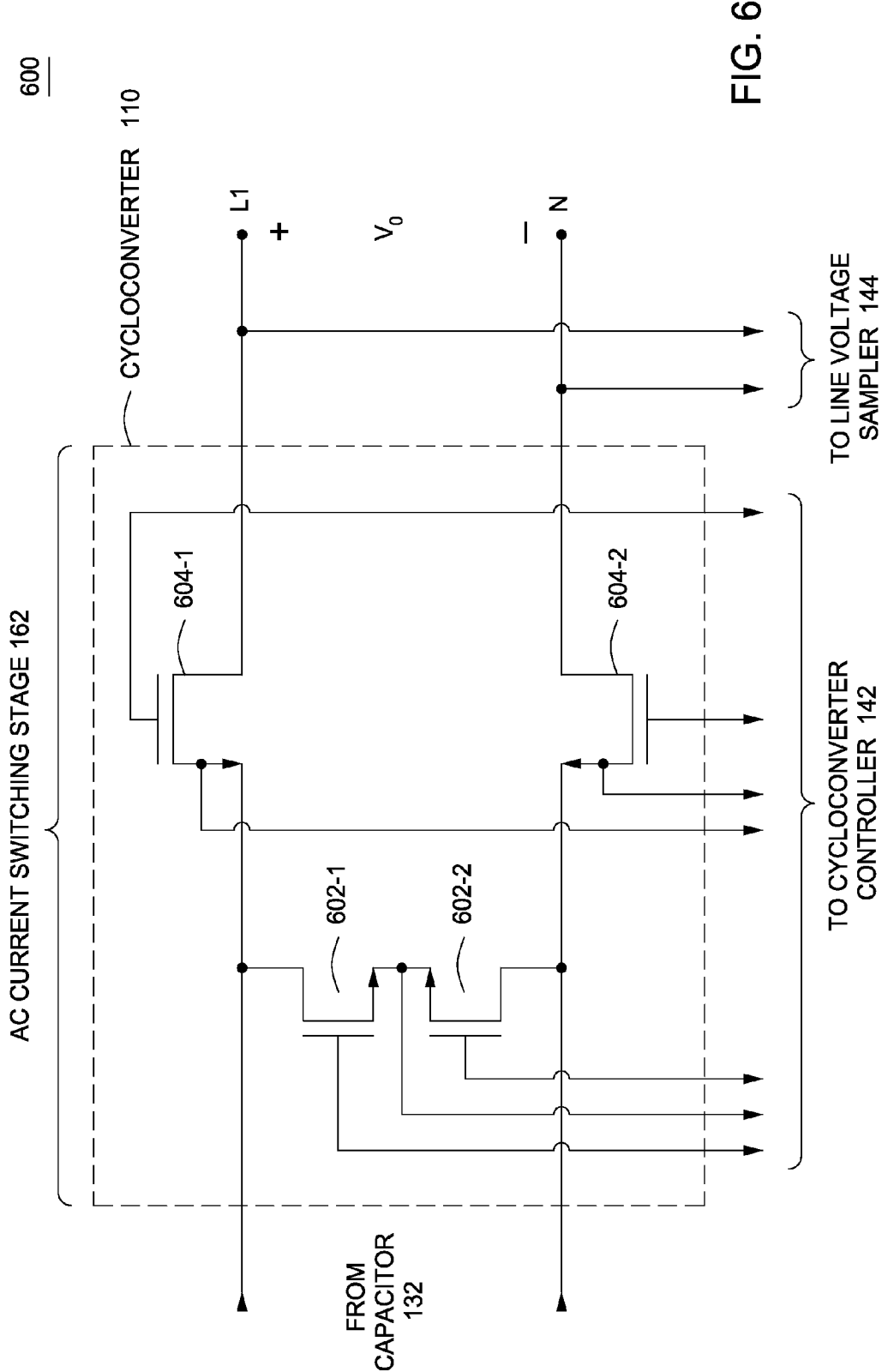
FIG. 6 is a schematic diagram of an alternative embodiment of a cycloconverter.

FIG. 6 is a schematic diagram of an alternative embodiment of a cycloconverter 110. The cycloconverter 110 depicted in FIG. 6 may be used for a single-phase application and comprises switches 602-1, 602-2, 604-1, and 604-2. A drain terminal of the switch 602-1 is coupled to the first terminal of the parallel output capacitor 132 and to a source terminal of the switch 604-1. Source terminals of the switches 602-1 and 602-2 are coupled together, and a drain terminal of the switch 602-2 is coupled to the second terminal of the output parallel capacitor 132 and a source terminal of the switch 604-2. Gate terminals and source terminals of each switch 602-1, 602-2, 604-1, and 604-2 are coupled to the cycloconverter controller 142 for operating (i.e., activating/deactivating) each of the switches. The switch pair 602-1/602-2 forms a first four-quadrant switch and the switch pair 604-1/604-2 forms a second four-quadrant switch. In some embodiments, the switches 602-1, 602-2, 604-1, and 604-2 may be n-type MOSFET switches; in other embodiments, other suitable switches and arrangements of switches may be utilized for the first and the second four-quadrant switches.

Drain terminals of the switches 604-1 and 604-2 are coupled to first and second output terminals, respectively, which in turn are coupled to lines L1 and N of a single-phase AC line. The line voltage sampler 144 is coupled across the first and second output terminals for sampling the AC line voltage.

During operation, the cycloconverter controller 142 operates the switches to half-wave rectify the current Ic into line L1 and steer the remaining half-period into the line N based on a single-phase current reference waveform received from the grid interface controller 156. When the single-phase current reference waveform is positive, the cycloconverter controller 142 activates the switch pair 604-1/604-2 and deactivates the switch pair 602-1/602-2 (i.e., one or both of switches 602-1/602-2 are deactivated) during each positive half-cycle of the current Ic; during each negative half-cycle of the current Ic, the cycloconverter controller 142 deactivates the switch pair 604-1/604-2 (i.e., one or both of switches 604-1/604-2 are deactivated) and activates the switch pair 602-1/602-2. Through such operation of the cycloconverter switches, the entire positive portion of the charge is injected into line L1 and the entire negative portion of the charge is injected into neutral.

When the single-phase current reference waveform is negative, the cycloconverter controller 142 activates the switch pair 604-1/604-2 and deactivates the switch pair 602-1/602-2 (i.e., one or both of switches 602-1/602-2 are deactivated) during each negative half-cycle of the current Ic; during each positive half-cycle of the current Ic, the cycloconverter controller 142 deactivates the switch pair 604-1/604-2 (i.e., one or both of switches 604-1/604-2 are deactivated) and activates the switch pair 602-1/602-2 during each positive half-cycle of the current Ic. Through such operation of the cycloconverter switches, the entire negative portion of the charge is injected into line L1 and the entire positive portion of the charge is injected into neutral.

During such a single phase application, both switching transitions are lossless.

Figure 7:
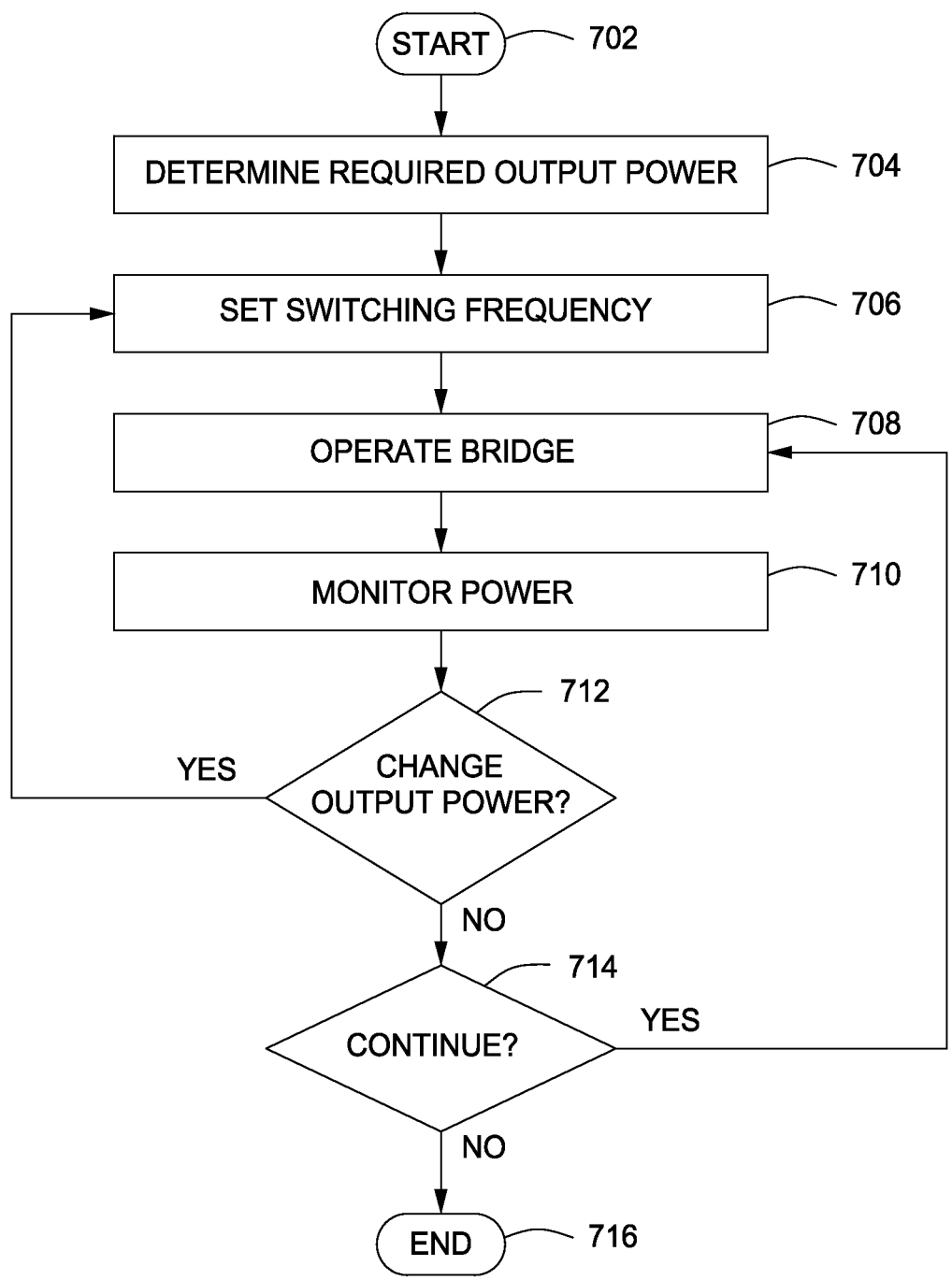
FIG. 7 is a flow diagram of a method for modulating output power from a resonant power converter in accordance with one or more embodiments of the present invention.

FIG. 7 is a flow diagram of a method 700 for modulating output power from a resonant power converter in accordance with one or more embodiments of the present invention. The method 700 is an implementation of the bridge controller 114.

In some embodiments, such as the embodiment described below, the resonant converter (e.g., the resonant converter 100) is coupled to a photovoltaic (PV) module for receiving a DC input voltage. The resonant converter utilizes a full-bridge within a DC-DC voltage switching stage at the input of the converter to generate a square wave from the DC input voltage. The resonant converter then converts the square wave to an AC output voltage. In one or more alternative embodiments, the resonant converter may utilize a half-bridge rather than a full-bridge for generating a square wave at the input of the converter.

The method 700 begins at step 702 and proceeds to step 704. At step 704, a required output power from the resonant converter is determined for biasing the PV module at a maximum power point (MPP). In some embodiments, a power controller, such as power controller 158, may determine the appropriate resonant converter output power. In one or more alternative embodiments, the resonant converter may be coupled to a DC power source other than a PV module, and a different required output power may be determined. At step 706, a switching frequency of the bridge is determined that will result in the required output power; i.e., the frequency is determined to produce the proper load impedance to the PV module to obtain maximum power from the PV module at current operating conditions. A bridge controller (such as the bridge controller 114) may determine the switching frequency based on the output power requirements and operate the bridge in accordance with the switching frequency. In one or more embodiments, output power requirements may be provided, e.g., to the bridge controller, via a reference current waveform that indicates a desired current to be generated by the resonant converter, where the reference current waveform is generated from one or more samples of an AC line voltage. In some embodiments, the switching frequency of the bridge may be on the order of 100 kilohertz (kHz) (i.e., the resonant frequency) to achieve the desired output power.

The method 700 proceeds to step 708 where the bridge is operated at the determined switching frequency. At step 710, output power from the bridge is monitored. For example, a current sampler (e.g., the current sampler 112) and a voltage sampler (e.g., the voltage sampler 138) may obtain current and voltage samples, respectively, of the current and voltage levels generated by the bridge. Such current and voltages samples are then utilized to compute the power from the bridge.

At step 712, a decision is made whether the power from the bridge should be modified (increased or decreased) in order to meet the converter output power requirement for MPP. In some embodiments, the bridge controller may receive the computed bridge power and make such a decision. If, at step 712, it is decided that the power from the bridge must be adjusted, the method 700 returns to step 706 where a new switching frequency is determined based on whether the bridge power must be increased or decreased. Such a feedback loop is performed to continuously optimize the output power of the DC-DC switching stage of the resonant converter. If, at step 712, it is decided that the bridge power does not require any modification, the method 700 proceeds to step 714.

At step 714, a decision is made whether to continue operating the resonant converter. If, at step 714, it is decided to continue operation, the method 700 returns to step 708. If, at step 714, it is decided that operation will not continue, the method 700 proceeds to step 716 where it ends.

Figure 8:
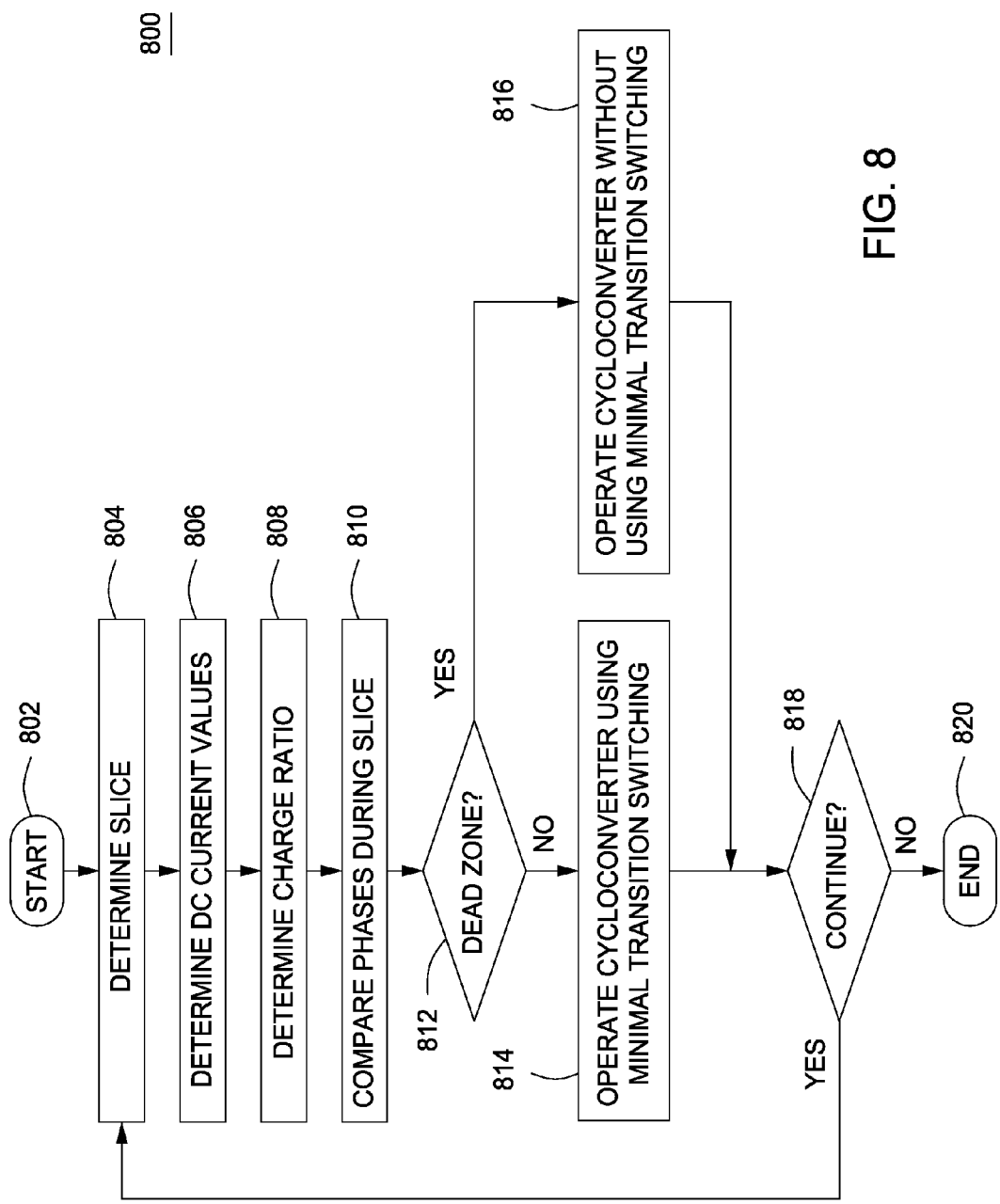
FIG. 8 is a flow diagram of a method of operation of an AC current switching stage in accordance with one or more embodiments of the present invention.

FIG. 8 is a flow diagram of a method 800 of operation of an AC current switching stage of a resonant converter in accordance with one or more embodiments of the present invention. In some embodiments, the method 800 is an implementation of the cycloconverter controller 142. In one or more embodiments, such as the embodiment described below, the AC current switching stage comprises a cycloconverter comprising three four-quadrant switches and is part of a resonant converter that converts a DC input to a three-phase AC output (e.g., the AC current switching stage 162 and cycloconverter 110 depicted in FIG. 1). In other embodiments, the AC current switching stage comprises a cycloconverter comprising two four-quadrant switches and is part of a resonant converter that converts the DC input to a single-phase AC output (e.g., the AC current switching stage 162 and the cycloconverter 110 depicted in FIG. 6).

The method 800 starts at step 802 and proceeds to step 804. At step 804, a slice of a three-phase reference current waveform is determined. The reference current waveform is a three-phase AC waveform and indicates a desired current to be coupled to an AC line at the output of the resonant converter, such as a commercial AC power grid operating at 60 Hz. The reference current waveform is synchronous with a line voltage waveform on the AC line and is generated based on samples of the line voltage. In some embodiments, i.e., for operating with a power factor of 1, the reference current waveform is generated in phase with the line voltage waveform. In other embodiments where reactive power is being produced by the resonant converter, e.g., for providing VAR compensation, the reference current waveform is generated out of phase with the line voltage waveform as required.

As previously described, the slice of the reference current waveform is a time window across all three phases of the reference current waveform. The slice may have a fixed width, for example on the order of 10 microseconds when the AC line is at 60 Hz, or the width may be variable from slice to slice (e.g., variation may be determined by the position in the phase). In some embodiments, a grid interface controller (e.g., grid interface controller 156) generates the reference current waveform based on inputs from a line voltage sampler and a power controller (e.g., line voltage sampler 144 and power controller 158), and couples the reference current waveform to a cycloconverter controller (e.g., cycloconverter controller 142) for determining the slice. At step 806, first, second, and third DC current values are determined to represent the current levels of the first, second, and third phases, respectively, of the reference current waveform within the slice. In some embodiments, the values of the current reference waveform phases at the beginning of the slice are utilized as the DC current values.

The method 800 proceeds to step 808, where a charge ratio for the slice is determined based on the DC values (i.e., the ratio of the first, the second, and the third DC current values). At step 810, the levels of the line voltage phases corresponding to the reference current waveform phases within the slice are compared to determine whether any are close enough in value for the slice to be considered a dead zone. If any two of the line voltage phases are close enough during the slice to satisfy a dead zone threshold (e.g., a threshold of 20V), it is determined that a dead zone exists for the corresponding lines. If no two of the line voltage phases are close enough during the slice to satisfy the threshold, it is determined that no dead zone exists. In some embodiments, the values of the line voltages at the beginning of the slice may be compared for determining any dead zones.

At step 812, a decision is made whether a dead zone exists. If no dead zone exists, the method 800 proceeds to step 814 and the cycloconverter is operated during the slice using minimal transition switching, as previously described. If a dead zone does exist, the method 800 proceeds to step 816 and the cycloconverter is operated without using minimal transition switching for the corresponding switches, as previously described. At both of steps 814 and 816, an approximately sinusoidal current, such as the current Ic, is generated at the input to the cycloconverter. The input current has a high frequency as compared to the AC line frequency; e.g., the cycloconverter may be coupled to an AC power grid operating at 60 Hz, and the input current may be on the order of 100 KHz. The cycloconverter divides the high-frequency input current based on the charge ratio for the slice and selectively couples the divided current to the appropriate output lines.

The method 800 proceeds from each of steps 814 and 816 to step 818. At step 818, a decision is made whether or not to continue operating the resonant converter. If a decision is made to continue, the method 800 returns to step 804 to determine the next slice; alternatively, if a decision is made to not continue, the method 800 proceeds to step 820 where it ends.

Figure 9:
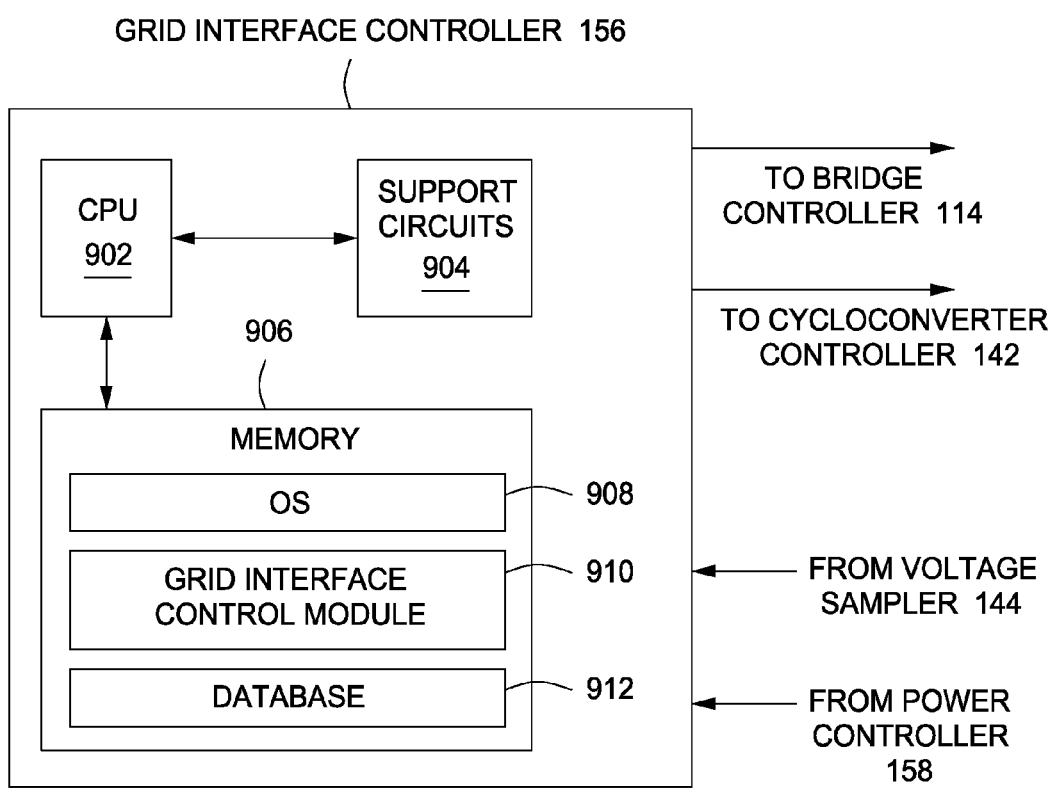
FIG. 9 is a block diagram of a grid interface controller 156 in accordance with one or more embodiments of the present invention.

FIG. 9 is a block diagram of a grid interface controller 156 in accordance with one or more embodiments of the present invention. The grid interface controller 156 comprises support circuits 904 and a memory 906, each coupled to a central processing unit (CPU) 902. The CPU 902 may comprise one or more conventionally available microprocessors or microcontrollers; alternatively, the CPU 902 may include one or more application specific integrated circuits (ASICs). The support circuits 904 are well known circuits used to promote functionality of the CPU 902. Such circuits include, but are not limited to, a cache, power supplies, clock circuits, buses, input/output (I/O) circuits, and the like. The grid interface controller 156 may be implemented using a general purpose computer that, when executing particular software, becomes a specific purpose computer for performing various embodiments of the present invention.

The memory 906 may comprise random access memory, read only memory, removable disk memory, flash memory, and various combinations of these types of memory. The memory 906 is sometimes referred to as main memory and may, in part, be used as cache memory or buffer memory. The memory 906 generally stores the operating system (OS) 908, if necessary, of the grid interface controller 156 that can be supported by the CPU capabilities.

The memory 906 may store various forms of application software, such as a grid interface control module 910 for performing functions related to the present invention. For example, the grid interface control module 910 may generate the single-phase reference current waveform and/or the three-phase reference current waveform, synchronize the single-phase reference current waveform and/or the three-phase reference current with an AC line voltage (for example, via a phase-locked loop), and the like.

The memory 906 may additionally store a database 912 for storing data related to the present invention, such as required output power levels, or the like.

In other embodiments, the CPU 902 may be a microcontroller comprising internal memory for storing controller firmware that, when executed, provides the grid interface controller functionality.

In some embodiments, two or more of the bridge controller 114, the cycloconverter controller 142, and the grid interface controller 156 may be a single controller controlled by the same CPU; i.e., a single controller may execute two or more of the bridge control module 210, the cycloconverter control module 310, or the grid interface control module 910.

The foregoing description of embodiments of the invention comprises a number of elements, devices, circuits and/or assemblies that perform various functions as described. For example, the cycloconverter is an example of a means for selectively coupling an alternating current to each line of the multi-phase AC line and the cycloconverter controller is an example of a means for determining a charge ratio from a reference waveform and driving the cycloconverter to selectively couple the alternating current to each line of the multi-phase AC line based on a charge ratio. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is determined by the claims that follow.

The invention claimed is:

1. An apparatus for providing multi-phase power, comprising:
   a transformer comprising a primary winding and a secondary winding;
   a resonant circuit coupled to the primary winding;
   a cycloconverter controller for determining a charge ratio based on a reference waveform; and a cycloconverter, coupled to the secondary winding, to the cycloconverter controller and to a multi-phase AC line, for selectively coupling an alternating current to each line of the multi-phase AC line based on the charge ratio, wherein the alternating current results from the resonant circuit and is a sinusoidally shaped single-phase waveform; and
   wherein selectively coupling the alternating current comprises partitioning a cycle of the alternating current based on the charge ratio and coupling each partitioned portion of the alternating current to a different phase of the multi-phase AC line.

2. The apparatus of claim 1, wherein the charge ratio indicates relative values of each phase of the reference waveform during a time window.

3. The apparatus of claim 2, wherein the cycloconverter controller dynamically determines the charge ratio for each time window of a plurality of consecutive time windows.

4. The apparatus of claim 1, wherein the reference waveform is synchronous with an AC voltage on the multi-phase AC line.

5. The apparatus of claim 1, wherein the resonant circuit is a series resonant circuit comprising a leakage inductance of the transformer and a capacitor.

6. The apparatus of claim 1, wherein selectively coupling the alternating current comprises deactivating a single switch on each output line of at least one output line.

7. A method for providing multi-phase power, comprising:
   generating an alternating current via a resonant circuit coupled to a primary winding of a transformer;
   coupling the alternating current to a cycloconverer coupled to a secondary winding of the transformer;
   determining a charge ratio based on a reference waveform;
   selectively coupling, by the cycloconverter, the alternating current to each line of a multi-phase AC line based on the charge ratio, wherein the alternating current is a sinusoidally shaped single-phase waveform;
   wherein selectively coupling the alternating current comprises partitioning a cycle of the alternating current based on the charge ratio and coupling each partitioned portion of the alternating current to a different phase of the multi-phase AC line.

8. The method of claim 7, wherein the charge ratio indicates relative values of each phase of the reference waveform during a time window.

9. The method of claim 8, wherein the charge ratio is dynamically determined for each time window of a plurality of consecutive time windows.

10. The method of claim 7, further comprising generating the reference waveform synchronous with an AC voltage on the multi-phase AC line.

11. The method of claim 7, wherein the resonant circuit is a series resonant circuit comprising a leakage inductance of the transformer and a capacitor.

12. The method of claim 7, wherein selectively coupling the alternating current comprises deactivating a single switch on each output line of at least one output line.

13. A system for providing multi-phase power, comprising:
   a photovoltaic (PV) module; and a resonant converter, coupled to the PV module and to a multi-phase AC line, comprising:
      a transformer comprising a primary winding and a secondary winding;
      a resonant circuit coupled to the primary winding;
      a cycloconverter controller for determining a charge ratio based on a reference waveform;
      a cycloconverter, coupled to the cycloconverter controller and to the multi-phase AC line, for selectively coupling an alternating current to each line of the multi-phase AC line based on the charge ratio, wherein the alternating current results from the resonant circuit and is a sinusoidally shaped single-phase waveform;
   wherein selectively coupling the alternating current comprises partitioning a cycle of the alternating current based on the charge ratio and coupling each partitioned portion of the alternating current to a different phase of the multi-phase AC line.

14. The system of claim 13, wherein the charge ratio indicates relative values of each phase of the reference waveform during a time window.

15. The system of claim 13, wherein the reference waveform is synchronous with an AC voltage on the multi-phase AC line.

16. The system of claim 13, wherein the resonant circuit is a series resonant circuit comprising a leakage inductance of the transformer and a capacitor.

17. The system of claim 13, wherein selectively coupling the alternating current comprises deactivating a single switch on at least one output line.

\* \* \* \* \*